Mar. 6, 1923.
C. M. DOWNEY.
VALVE GEAR.
FILED MAR. 26, 1919.
1,447,412.
4 SHEETS—SHEET 4.
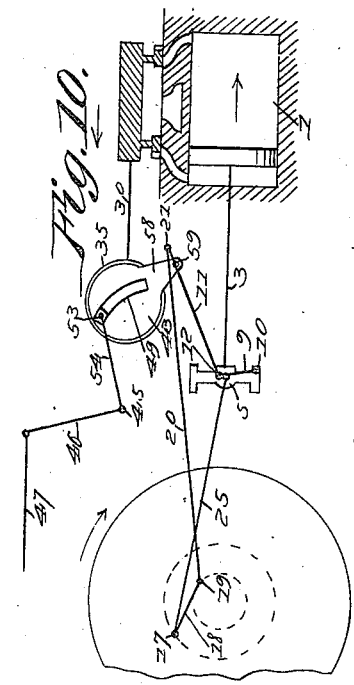
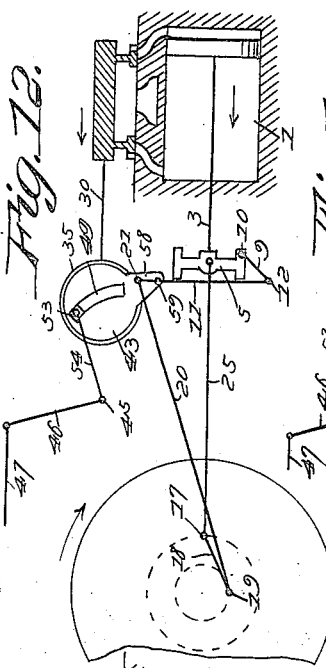
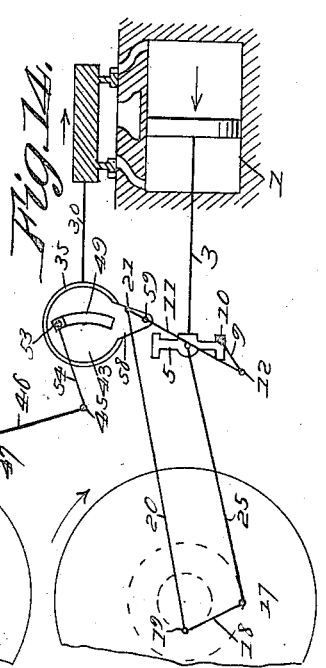
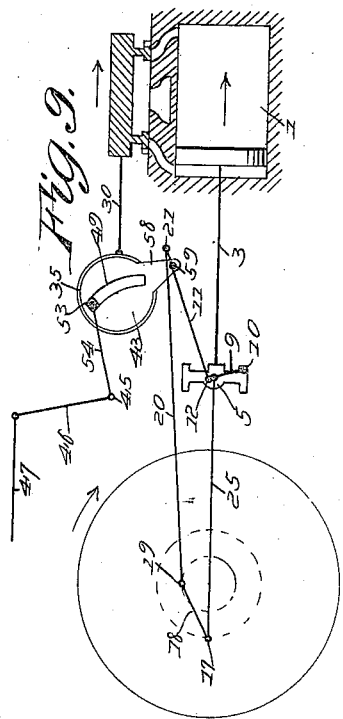
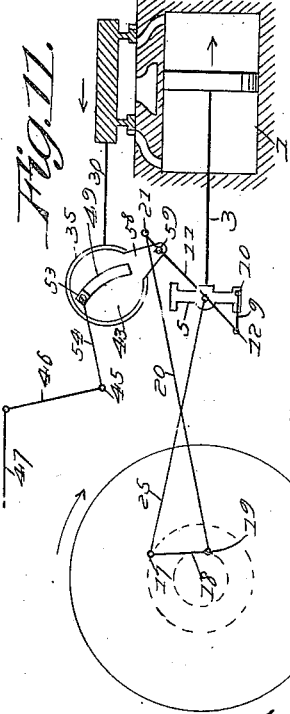
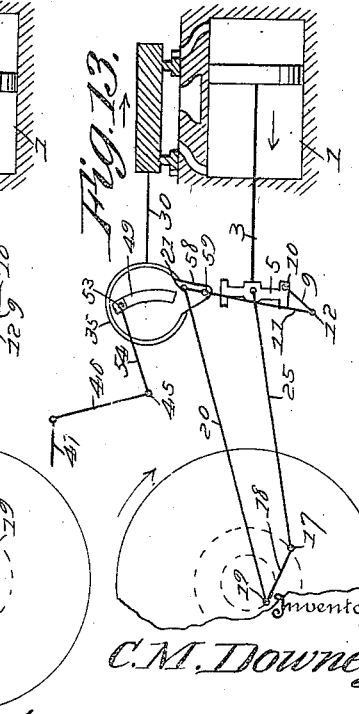
Inventor
C. M. Downey,
By Watson E. Coleman
Attorney Patented Mar. 6, 1923.

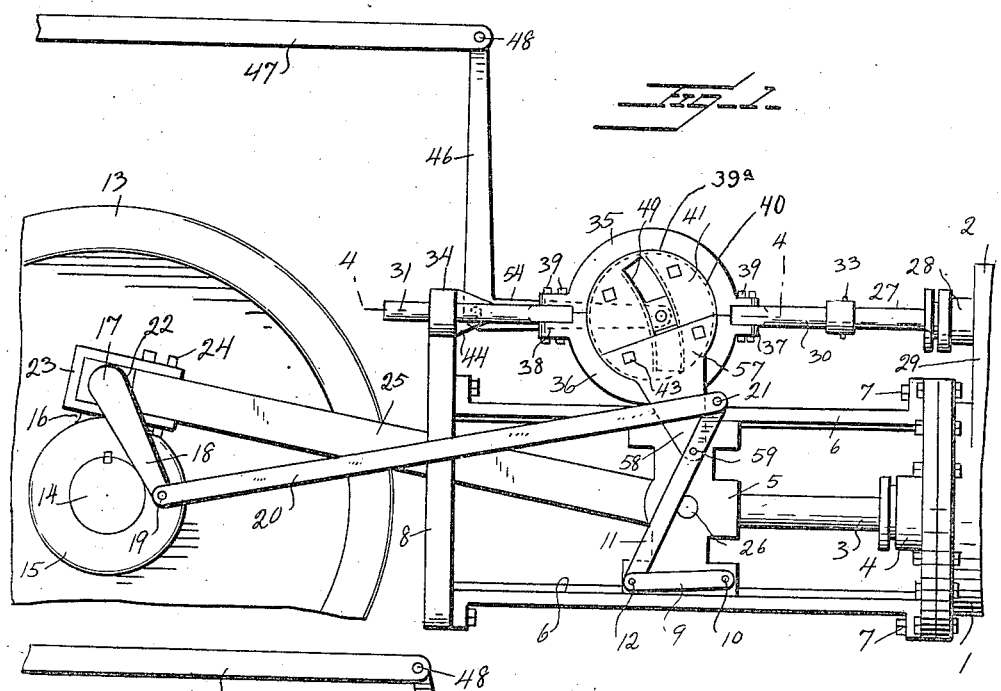

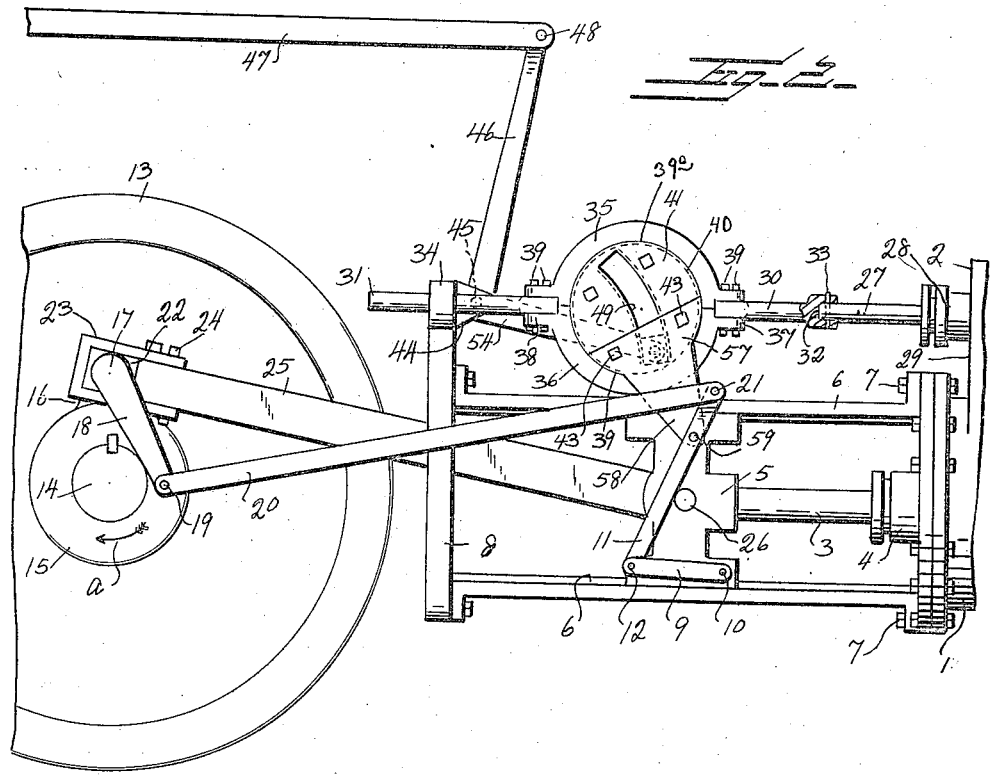
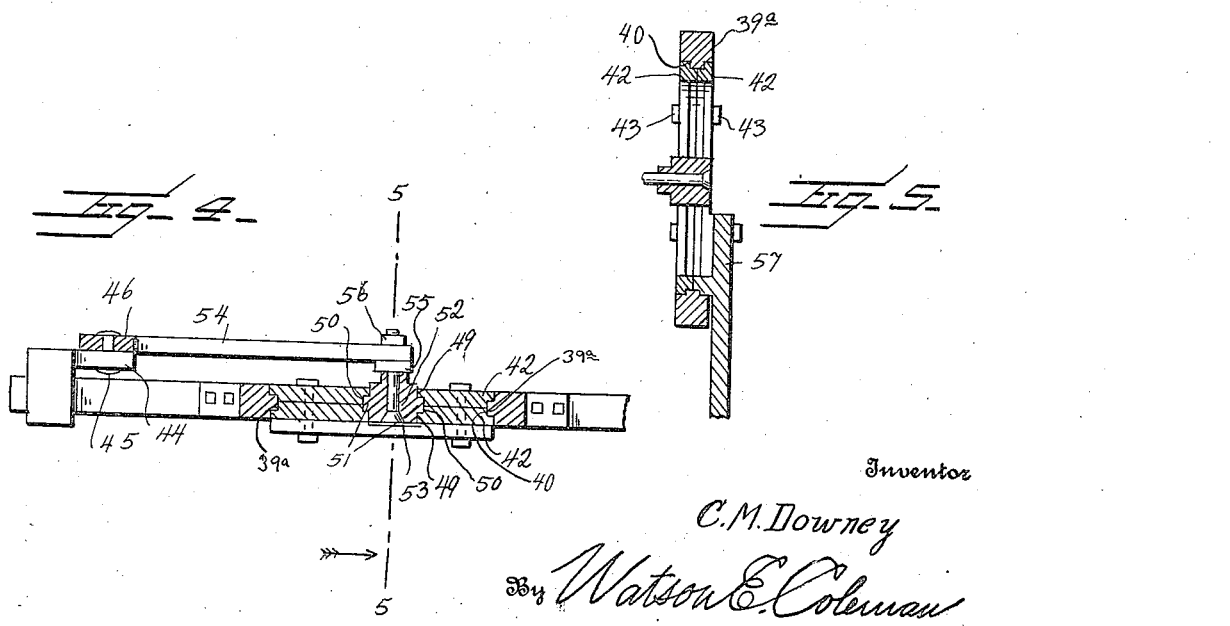

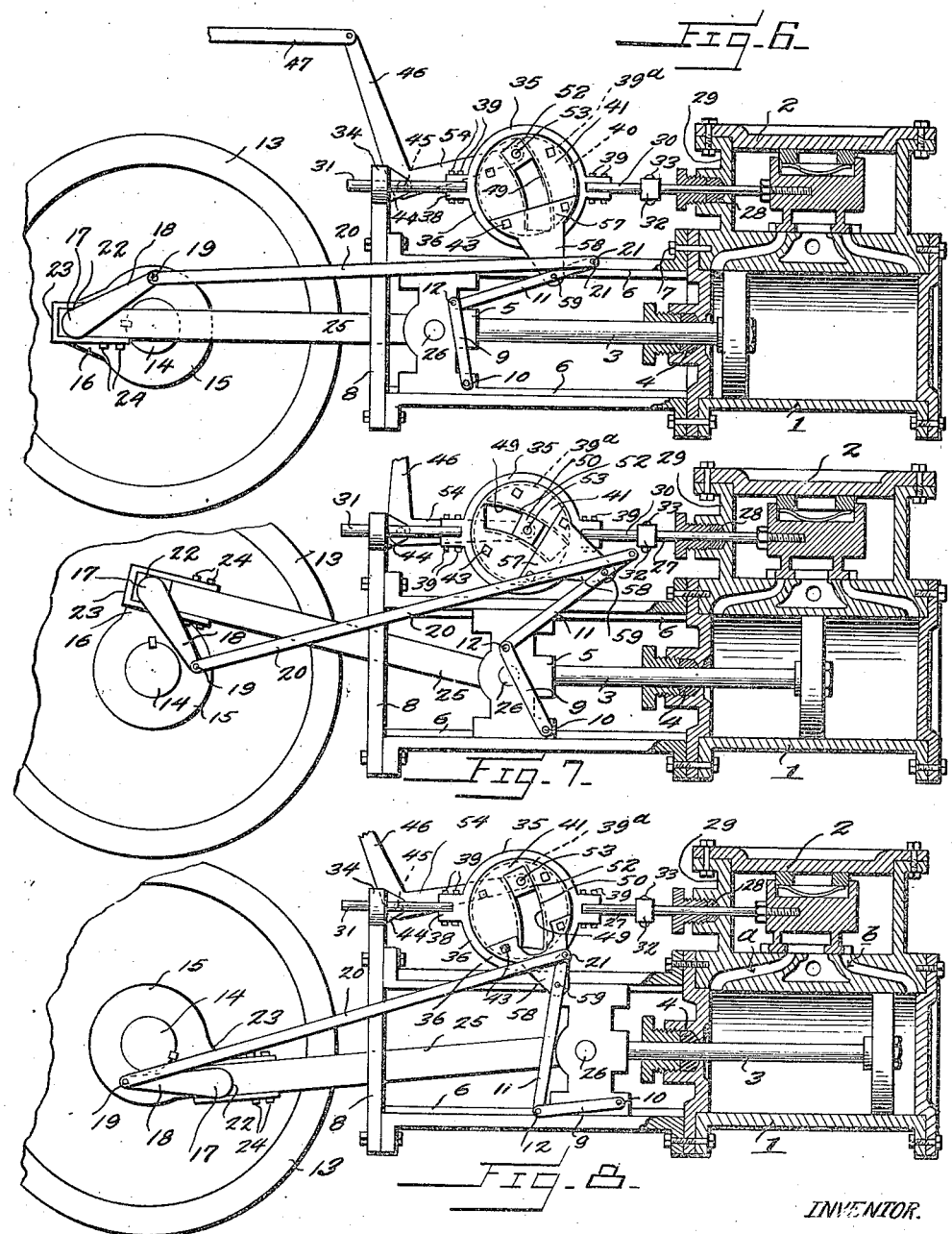

1,447,412

UNITED STATES PATENT OFFICE.

CHARLES M. DOWNEY, OF SHENANDOAH, VIRGINIA, ASSIGNOR OF ONE-HALF TO HUBERT C. BICKERS AND ONE-HALF TO WILLIAM T. MILLER, BOTH OF SHENANDOAH, VIRGINIA.

VALVE GEAR.

Application filed March 26, 1919. Serial No. 285,231.

*To all whom it may concern:*

Be it known that I, CHARLES M. DOWNEY, a citizen of the United States, residing at Shenandoah, in the county of Page and State of Virginia, have invented certain new and useful Improvements in Valve Gears, of which the following is a specification, reference being had to the accompanying drawings.

It is the purpose of the present invention to provide an improved valve gear, particularly adapted for use in connection with locomotives, but it is obvious that such valve gear is fully applicable to stationary engines.

The invention aims to provide a simple, practical and cheaply constructed valve gear, which may be easily and in a practical manner applied to different constructions of engines, either the locomotive or stationary type.

Heretofore valve gears have been produced involving means for compensating for the lap and lead, for instance for valve gears of the Walschaert type, wherein the lap and lead lever is connected direct with the radius rod and the valve rod. In this construction of valve gears it is the aim to control the operation of the valve, in such wise as to permit of the exhaust of the entire amount of steam on one side of the piston, before steam is admitted upon the opposite side, and vice versa, thereby obviating any back pressure on the piston. It is well known that to change the lead of a valve gear, it is necessary to change either the lap of the valve or the distance between the connecting points of the lap and lead lever. The reducing of the lap of the valve increases the lead, and vice versa. The changing of the lap also changes the point of cut off. Furthermore if the lap is reduced, the cut off will occur at a later period in the stroke; while if it is increased, the opposite result will occur.

It is, therefore, the purpose of the present invention to provide an improved construction of valve gear, wherein a radius bell crank lever 46 is substituted for what is heretofore known as the radius rod, it being the aim to connect the radius bell crank lever to a shifting eccentric employed in connection with the valve rod, in combination with a lap and lead lever, which operatively connects with the shifting eccentric rocker and the cross head, through the medium of the link, in combination with a pitman, which is operatively connected to an eccentric crank of the drive shaft of the engine. This construction is designed for the purpose of taking care of the lap and lead more efficiently.

The invention further aims to provide a device of this general design, in which the usual rocker box is eliminated, and also in which certain joints heretofore employed are dispensed with, and in lieu thereof the substitution of a connection between the cross head, eccentric crank, the valve rod and the radius bell crank lever.

In the drawings:—

Figure 1 is a view in side elevation of a portion of the steam cylinder and its chest, showing the improved valve gear as applied and operatively connected to the driving shaft of the engine;

Figure 2 is a similar view showing the radius bell crank lever as having been operated, to shift the eccentric rocker for driving the locomotive forwardly;

Figure 3 is a view in side elevation showing the application of the valve gear, and the radius bell crank lever as having been reversed for driving the locomotive rearwardly;

Figure 4 is a sectional view on line 4—4 of Figure 1;

Figure 5 is a sectional view on line 5—5 of Figure 4;

Figure 6 is a view in side elevation of the valve gear with the steam chest and steam cylinder in section, illustrating the valve on its seat in a position to permit the steam to enter, to permit motion to the piston of the cylinder for driving the locomotive rearwardly;

Figure 7 is a view in side elevation of the valve gear with the steam cylinder and steam chest in section, showing the valve, piston and the cross head in their intermediate positions;

Figure 8 is a view in elevation of the valve gear, showing the cross head at the opposite end of its stroke, with the valve and piston substantially reversed to that shown in Figure 6, the steam being in the act of entering to operate the piston in the opposite direction to that in Figure 6.

Figure 9 is a diagrammatic view of the valve gear, showing the positions of the lap and lead link, the eccentric crank and the radius bell crank lever, with the piston moving forward in the cylinder;

Figure 10 is a diagrammatic view showing the eccentric crank, the lap and lead lever and link and the radius bell crank lever in another position, with the piston moving forward in the cylinder;

Figure 11 is a diagrammatic view showing other positions of the corresponding parts shown in Figures 9 and 10;

Figure 12 is a diagrammatic view showing the eccentric crank, the lap and lead lever and its link and the radius bell crank lever in other positions, with the piston as having completed its stroke forward in the cylinder;

Figure 13 is a diagrammatic view showing other positions of the corresponding parts shown in Figure 12 with the piston moving rearwardly in the cylinder; and Figure 14 is a diagrammatic view, still showing the piston moving rearwardly in the cylinder, with the lap and lead lever and its link and the eccentric crank and the radius bell crank lever in other positions, thereby completing the revolution of the drive shaft 14.

Referring to the drawings, 1 designates a portion of the steam cylinder, and 2 denotes a portion of the steam chest. A suitable piston rod 3 including its piston is provided, to operate through the usual packing box or gland 4 of the steam cylinder. This piston rod is connected in any suitable manner to a suitable cross head 5, which is provided for reciprocating motions in the guides 6. These guides are connected at 7 to the cylinder head of the steam cylinder, and have their other ends connected to, supported and braced by a member 8.

The lap or lead link 9 is pivoted at 10 to the cross-head, and a lap or lead lever 11 is pivotally connected at 12 to the lap or lead link 9. Disclosed in the drawings is the usual drive wheel 13 of a locomotive. However, this drive wheel may be utilized as a fly wheel of a stationary engine, it being understood that the invention is not to be limited to either one. This drive or fly wheel 13 is mounted upon a drive shaft 14, which may constitute the drive axle of a locomotive, or power shaft of a stationary engine.

A hub 15 having an arm 16 is mounted upon the drive or power shaft 14 to move therewith. A crank pin 17 is mounted in a bearing of the arm 16, and has an eccentric crank 18, which terminates at a point eccentric to the center of the shaft 14 and the hub 15, but on a less radius from the center of the shaft 14 than the radius of the crank pin is relative to the center of the shaft. An eccentric rod 20 is pivotally connected upon the pin 19 at the end of the eccentric crank 18, and is in turn pivotally connected to the lap and lead lever 11 at 21.

A Babbitt or other suitable bearing 22 is mounted upon the crank pin of the arm 16, there being a U-shaped holding strap 23 engaging the bearing 22, and has its arms secured at 24 to a pitman 25, which in turn is pivotally connected at 26 to the cross-head 5.

A suitable valve rod 27 is operable through a packing gland or stuffing box 28 of a conventional form of steam chest 29, wherein a conventional form of slide valve is mounted for the usual reciprocating movements.

Suitable front and rear guide bars 30 and 31 are herein disclosed. The guide bar 30 has a socket 32 for the reception of the outer end of the valve rod, there being a transverse key 33 passing through the walls of the socket and through the valve rod, thereby connecting the valve rod and the front guide bar. The guide bar 31 is operable through a guide 34 of the member 8.

Semi-circular rocker or eccentric supporting straps 35 and 36 are supplied, and have their lateral ends 37 and 38 bolted or otherwise secured at 39 to the front and rear guide bars 30 and 31. The inner surfaces of these supporting straps are provided with ribs 39ª, to be engaged by the annular groove 40 of the eccentric rocker 41. This eccentric rocker comprises the opposing circular sections 42, which are bolted together as at 43. Pivoted on a lug or projection 44 as at 45 is a radius bell crank lever 46, there being a reach or shifting rod 47 pivoted at 48 to one of the arms of the radius bell crank lever 46.

The opposing sections of the eccentric rocker are provided with arcuate slots 49, which are in registration, and the adjacent faces of the opposing sections immediately adjoining the slots 49 are provided with arcuate recesses 50, which are angular in cross section. When the opposing sections 42 are bolted together as shown these arcuate recesses (which are angular in cross section) form grooves upon the opposite sides of the arcuate slot, which is formed by the two slots being in registration. These opposing grooves (which are formed by the arcuate recesses) receive the opposite ribs 51 of the die block 52. A suitable headed pivot pin 53 is mounted in the die block, and on which the end of the arm 54 of the radius bell crank lever 46 is pivotally mounted, there being a spacing ring 55 between the end of the arm 54 and the die block, and a nut 56 is threaded on the end of the pin 53, thereby providing a pivotal connection between the die block and the radius bell crank lever. The body portion 57 of the rocker arm 58 is secured to the eccentric rocker by the two bolts 43. The end of the rocker arm 58 is pivotally connected as at 59 to the lap and lead lever 11.

Referring to Figures 1 and 7 it will be noted that the die block 52 is in its neutral position in the arcuate slots 49 of the eccentric rocker, that is centrally in the slot, in which case the valve of the steam chest is positioned neutrally, in order to cover both steam ports, thereby preventing steam from entering the steam cylinder.

When starting, the reach or operating lever 47 is shifted, to impart movement to the radius bell crank lever 46. If the radius bell crank lever is moved so as to raise the die block upwardly in the arcuate slot, as shown in Figures 3, 6 and 8, the valve will be moved to uncover one of the ports for admitting steam to the cylinder, whereby the drive or power shaft 14 may operate to operate the locomotive rearwardly.

It will be noted that the eccentric crank 18 terminates at a position 90° relatively to the crank pin 17, and being that the eccentric rod 20 operatively connects with the lap and lead lever, which in turn operatively connects to the rocker arm 58 of the eccentric rocker, the valve is operated to compensate for the lap and lead, in covering and uncovering the steam ports to the cylinder, to insure the exhaust of the utilized steam, before steam is admitted upon the opposite side of the piston.

When the steam enters the cylinder and actuates the piston with the die block in its lowermost position, the locomotive may travel forwardly. When the die block is neutral, the arcuate slots are at an angle to the die block, in which case the valve is positioned to cover the steam ports of the cylinder. However when the die block is raised or lowered, the eccentric rocker is rocked in one direction or the other, it depending entirely upon the direction the shaft is to be rotated. A vertical movement of the die block to a lowered position will cause the locomotive to travel forwardly, and a vertical movement of the die block to a raised position will act to reverse the locomotive.

The invention having been set forth, what is claimed is:—

1. The combination with a steam cylinder, a steam chest, ports connecting the cylinder and the chest, a piston and valve mounted respectively therein, a cross head operable in guides and connected to the piston, a valve rod, an eccentric rocker, a slot therein, a block in said slot, a strap on said eccentric rocker and connected to the valve rod, a power shaft operatively connected to and actuated by the cross head, an eccentric crank, a lap and lead lever pivotally connected to the eccentric rocker, an eccentric rod connecting the eccentric crank and one end of the lap and lead lever, a lap and lead link connecting the lap and lead lever to the cross head for oscillating the valve, and to uncover the ports connecting the cylinder and chest, and a radius bell crank lever operatively connected with the block in said slot in said eccentric rocker for shifting said block for reversing the motion of the valve, and changing the point of cut off and the direction of motion of the shaft.

2. In an engine, a steam cylinder including a piston, a steam chest having ports of communication with the cylinder and including a valve, a cross head mounted in guides of the engine and operatively connecting with the piston, a lap and lead link pivotally connected to the cross head, a power shaft, an eccentric crank operatively connected to the shaft, an eccentric rod connected to the end of the eccentric crank, a lap and lead lever connected at its opposite ends to the lap and lead link and the eccentric rod, a valve rod connected to the valve, an eccentric rocker, a strap on said eccentric rocker operatively connected to and actuating the valve rod and the valve, a rocker arm on said eccentric rocker pivotally connected with the lap and lead lever between its pivotal connections to the eccentric rod and the lap and lead link, and means for oscillating the eccentric rocker to cause the valve to uncover one or the other of the ports of communication with the steam cylinder.

3. In an engine, a steam cylinder including a piston, a steam chest having ports of communication with the cylinder and including a valve, a cross head mounted in guides of the engine and operatively connected with the piston, a lap and lead link pivotally connected to the cross head, a power shaft, an eccentric crank operatively connected to the shaft, an eccentric rod connected to the end of the eccentric crank, a lap and lead lever connected at its opposite ends to the lap and lead link and the eccentric rod, a valve rod connected to the valve, an eccentric rocker having a strap thereon operatively connected to and actuating the valve rod and the valve, a rocker arm on said eccentric rocker pivotally connected with the lap and lead lever between its pivotal connections to the eccentric rod and the lap and lead link, means for oscillating the eccentric rocker to cause the valve to uncover one or the other of the ports of communication with the steam cylinder, the eccentric rocker comprising two sections having arcuate slots, a block operable in the slots and being operatively connected to the eccentric rocker oscillating means, and means for shifting the block and changing the point of cut off and reversing the direction of rotation of the shaft.

In testimony whereof I hereunto affix my signature in the presence of two witnesses.

CHARLES M. DOWNEY.

Witnesses:
M. A. ASHBY,
H. C. BICKERS.